(12) United States Patent
Einat et al.

(10) Patent No.: US 9,207,317 B2
(45) Date of Patent: Dec. 8, 2015

(54) PASSIVE MILLIMETER-WAVE DETECTOR

(75) Inventors: Moshe Einat, Ariel (IL); Boris Kapilevich, Rishon le Zion (IL); Boris Litvak, Maale Adumim (IL); Alexander Shulzinger, Ariel (IL)

(73) Assignee: ARIEL-UNIVERSITY RESEARCH AND DEVELOPMENT COMPANY LTD., Ariel (IL)

( * ) Notice: Subject to any disclaimer, the term of this patent is extended or adjusted under 35 U.S.C. 154(b) by 219 days.

(21) Appl. No.: 14/111,555

(22) PCT Filed: Apr. 12, 2012

(86) PCT No.: PCT/IB2012/051783
§ 371 (c)(1),
(2), (4) Date: Nov. 11, 2013

(87) PCT Pub. No.: WO2012/140587
PCT Pub. Date: Oct. 18, 2012

(65) Prior Publication Data
US 2014/0253362 A1    Sep. 11, 2014

Related U.S. Application Data

(60) Provisional application No. 61/475,692, filed on Apr. 15, 2011.

(51) Int. Cl.
*G01S 13/04* (2006.01)
*G01S 13/88* (2006.01)
(Continued)

(52) U.S. Cl.
CPC .............. *G01S 13/887* (2013.01); *G01V 8/005* (2013.01)

(58) Field of Classification Search
CPC ....... G01S 13/88; G01S 13/887; G01S 13/04; G01S 7/02; G01S 7/28; G01S 7/285; G01S 7/292; G01S 7/2921; G01S 7/2922; G01S 7/024; G01S 7/025; G01S 7/04; G01S 7/06; G01S 7/20; G01S 7/24; G01S 13/02; G01S 13/06; G01S 13/003; G01S 13/08; G01S 13/32; G01S 13/34; G01S 13/345; G01S 13/86; G01S 13/888; G01S 13/89; G01V 8/005; G01N 22/00; G06T 5/50; H01Q 13/20; H01Q 13/24; H04N 7/18; H04N 5/222; H04N 5/262; H04N 5/272; G08B 13/18; G08B 13/189; G08B 13/194; G08B 13/196; G08B 13/19654; G08B 13/19656
USPC ........... 342/21, 22, 27, 28, 89, 175, 176, 179, 342/192–197, 350, 351, 91; 340/500, 531, 340/539.1, 539.11; 250/336.1, 338.1; 343/700 R, 753, 754

See application file for complete search history.

(56) References Cited

U.S. PATENT DOCUMENTS

| 5,047,783 A * | 9/1991 | Hugenin .................. G01S 7/024 342/179 |
| 5,073,782 A * | 12/1991 | Huguenin ............... G01S 7/024 342/179 |

(Continued)

FOREIGN PATENT DOCUMENTS

| EP | 1868005 | 12/2007 |
| WO | 2004003843 | 5/2004 |
| WO | 2010125322 | 11/2010 |

OTHER PUBLICATIONS

Sato et al., Development of 77 GHz Millimeter Wave Passive Imaging Camera, IEEE Sensors 2009 Conference, pp. 1632-1635, 978-1-4244-5335-1/09.

(Continued)

*Primary Examiner* — Bernarr Gregory
(74) *Attorney, Agent, or Firm* — The Law Office of Joseph L. Felber

(57) ABSTRACT

Disclosed are passive millimeter wave detection devices that in some embodiments are useful for detecting objects such as weapons obscured underneath clothing. Also disclosed are methods for detecting objects using millimeter waves, in some embodiments, objects such as weapons, obscured underneath clothing.

20 Claims, 7 Drawing Sheets

(51) Int. Cl.
*G01S 7/285* (2006.01)
*G01V 8/00* (2006.01)
*G01S 13/00* (2006.01)
*G01S 7/00* (2006.01)

(56) References Cited

U.S. PATENT DOCUMENTS

| | | | | |
|---|---|---|---|---|
| 5,227,800 | A * | 7/1993 | Huguenin | G01S 7/024 342/179 |
| 5,760,397 | A | 6/1998 | Huguenin et al. | |
| 6,243,036 | B1 * | 6/2001 | Chadwick | G01S 7/025 342/175 |
| 6,353,224 | B1 * | 3/2002 | Sinclair | G01V 8/005 342/179 |
| 6,359,582 | B1 * | 3/2002 | MacAleese | G01S 13/04 342/192 |
| 6,480,141 | B1 * | 11/2002 | Toth | G01N 22/00 342/22 |
| 6,777,684 | B1 | 8/2004 | Volkov et al. | |
| 6,791,487 | B1 * | 9/2004 | Singh | G01S 13/04 342/192 |
| 6,856,271 | B1 * | 2/2005 | Hausner | G01S 7/025 342/195 |
| 6,914,552 | B1 * | 7/2005 | McEwan | G01S 13/04 342/193 |
| 6,950,054 | B1 | 9/2005 | Steinway et al. | |
| 6,967,612 | B1 * | 11/2005 | Gorman | G01S 13/04 342/175 |
| 7,167,123 | B2 * | 1/2007 | Hausner | G01S 7/025 342/22 |
| 7,194,236 | B2 * | 3/2007 | Lovberg | G01S 13/887 342/27 |
| 7,209,035 | B2 * | 4/2007 | Tabankin | G08B 13/19656 340/539.11 |
| 7,271,899 | B2 * | 9/2007 | Anderton | G01V 8/005 343/754 |
| 7,319,233 | B2 * | 1/2008 | Nelson | G01N 22/00 342/22 |
| 7,385,552 | B2 * | 6/2008 | Archer | G01S 13/887 342/179 |
| 7,405,692 | B2 * | 7/2008 | McMakin | G01S 7/20 342/22 |
| 7,415,244 | B2 * | 8/2008 | Kolinko | G01V 8/005 342/179 |
| 7,450,052 | B2 * | 11/2008 | Hausner | G01S 13/04 342/22 |
| 7,492,303 | B1 * | 2/2009 | Levitan | G01S 7/024 342/22 |
| 7,679,546 | B2 * | 3/2010 | Bublitz | H04N 7/18 342/175 |
| 7,692,150 | B2 * | 4/2010 | Jung | G01S 13/89 250/338.1 |
| 7,782,251 | B2 * | 8/2010 | Bishop | G01S 13/89 342/179 |
| 7,800,527 | B2 * | 9/2010 | Douglass | G01S 13/887 342/175 |
| 7,804,442 | B2 * | 9/2010 | Ammar | G01S 13/887 342/179 |
| 7,873,182 | B2 * | 1/2011 | Andrew | H04N 5/272 342/195 |
| 7,889,113 | B2 * | 2/2011 | Cardiasmenos | G01V 8/005 342/175 |
| 7,907,081 | B2 * | 3/2011 | Noyman | H01Q 13/24 342/179 |
| 7,973,704 | B2 * | 7/2011 | Storz | G01S 7/24 342/175 |
| 7,982,656 | B2 * | 7/2011 | Coward | G01S 13/887 342/179 |
| 8,169,355 | B2 * | 5/2012 | Bartscher | G01S 13/887 342/175 |
| 8,253,619 | B2 * | 8/2012 | Holbrook | G01S 13/86 342/175 |
| 8,368,586 | B2 * | 2/2013 | Mohamadi | G01S 13/888 342/175 |
| 8,390,504 | B2 * | 3/2013 | Abdillah | G01V 8/005 342/22 |
| 8,487,255 | B2 * | 7/2013 | Sarkis | G06T 5/50 250/336.1 |
| 8,547,274 | B2 * | 10/2013 | Reinpoldt, III | G01S 13/887 342/179 |
| 8,593,329 | B2 * | 11/2013 | Mohamadi | G01S 13/888 342/22 |
| 8,730,087 | B2 * | 5/2014 | Filippi | G01S 13/033 342/27 |
| 2003/0222809 | A1 * | 12/2003 | Nakazawa | G01S 13/345 342/28 |
| 2004/0080448 | A1 | 4/2004 | Lovberg et al. | |
| 2005/0099330 | A1 | 5/2005 | Hausner et al. | |
| 2007/0139249 | A1 * | 6/2007 | Baharav | G01S 13/89 342/22 |
| 2009/0195435 | A1 | 8/2009 | Kapilevich et al. | |

OTHER PUBLICATIONS

International Search Report and Written Opinion for PCT/IB2012/051783, Apr. 9, 2013.
Appleby R in "Passive Millimetre-Wave Imaging and How It Differs From Terahertz Imaging," Phil Trans R Soc, London, A (2004) 362, 379-394.
Yujiri L, Shoucri M, Moffa P in "Passive Millimeter Wave Imaging," IEEE Microwave Magazine 2003, September, 39-50.
Manasson VA, Sadovnik LS, Mino R, Rodionov S in "Novel Passive Millimetre Wave Imaging System: Prototype Fabrication and Testing" Passive Millimeter-Wave Imaging Technology, Proc. SPIE Optical Engineering 2000, v.5070, Apr. 21, 2-13.
Kapilevich B, Litvak B, Einat M, Shotman O in "Passive mm-Wave Sensor for Indoor and Outdoor Homeland Security Applications" Proc. 2007 International Conference on Sensor Technologies and Applications, Spain, 20-23.
Sheen DM, McMakin DL, Hall TE in "Three-Dimensional Millimeter-Wave Imaging for Concealed Weapon Detection," IEEE Transactions on Microwave Theory and Techniques 2001, v.49, n.9, 1581-1592.
Sheen et al., "Near Field Imaging at Microwave and Millimeter Wave Frequencies," IEEE, 1-4244-0688-9/07, 2007, pp. 1693-1696.
Kapilevich B, Einat M, Litvak B, Shulsinger A, Nehemia E in "Experimental Study of Indoor mm-Wave Imaging Resolution Limits" Workshop Nefertiti-2005, Brussels, paper #111.
Boykin RD in "A Brief Overview of T-ray (THz) Imaging", DX2 Report, May 12, 2005, http://ric.uthscsa.edu/personalpages/lancaste/D12_Projects_2005/T-Ray.pdf.
Cooper KB, Dengler RJ, Chattopadhyay G, Schlecht E, Gill J, Skalare A, Mehdi I, Siegel PH in "A High-Resolution Imaging Radar at 580 GHz", IEEE microwave and wireless components letters 2008, v.18, n. 1, January, 64-66.
Dickinson JC, Goyette TM, Gatesman AJ, Joseph CS, Root ZG, Giles RH, Waldman J, Nixon WE, "Terahertz imaging of subjects with concealed weapons" Proc. SPIE 2006, vol. 6212, 62120Q01-62120Q12.
Kemp MC, Taday PF, Cole BE, Cluff JA, Fitzgerald AJ, Tribe WR, "Security Applications of Terahertz Technology," Proc. SPIE 2003, v.5070, 44-52.
Petkie DT, DeLucia FC, Casto C, Helminger P, Jacobs EL, Moyer SK, Murrill S, Halford C, Griffin S, Franck C in "Active and Passive Millimeter and Sub-Millimeter-Wave Imaging," Proc. SPIE 2005, v.5989, 598918-1-598918-8.
Tryon G, "Passive Millimeter-Wave Object Detection and People Screening", presentation at 2007 SURA Terahertz Applications Symposium Jun. 6-8, Washington, DC.
McMillan RW, Currie NC, Ferris DD, Wicks MC Jr. In "Concealed Weapon Detection Using Microwave and Millimeter Wave Sensors" Microwave and Millimeter Wave Technology Proc 1998 ICMMT'98, 1-4.
Sheen DM, McMakin DL, Lechelt WM, Griffin JW in "Circularly Polarized Millimeter-Wave Imaging for Personnel Screening" Proc. SPIE Optical Engineering 2005, v.5789, 21, April, 117-126.

* cited by examiner

PASSIVE MILLIMETER-WAVE DETECTOR

RELATED APPLICATION

The present application is the US National Phase entry of PCT/IB2012/051783 having an International Filing Date of Apr. 12, 2012 that was published on Oct. 18, 2012 as WO 2012/140587 and gains priority from U.S. Provisional Patent Application No. 61/475,692 filed Apr. 15, 2011, both which are incorporated by reference as if fully set forth herein.

FIELD AND BACKGROUND OF THE INVENTION

The invention, in some embodiments, relates to the field of detection devices and more particularly, in some embodiments, to passive detection devices and methods using electromagnetic radiation having millimeter wavelengths.

Detection of objects obscured from view is a long standing need in various fields such as in defense and security, medicine, industry and transportation. An object may be obscured from view if it is prevented from reflecting or emitting light, such as when located in a dark room, or if located behind an opaque or light-scattering medium, such as when located in fog or smoke, or when located on the body of a person and obscured behind clothing.

As is well known in the art of detection devices, an object emits electromagnetic radiation with an intensity that is dependent on the temperature and the emissivity of the object. An object at a lower temperature emits less radiation than the same object at a higher temperature and, at equal temperatures, an object having a higher emissivity emits more radiation than an object having a lower emissivity.

This characteristic of electromagnetic radiation has been used to create imaging devices configured to provide images of objects using non-visible electromagnetic radiation (e.g., IR, X-ray), which devices are often used for detecting concealed objects. However, the use of such devices, particularly in contexts such as homeland security, is limited or prohibited due to physical constraints, safety regulations, privacy violation limitations, physical size and high cost.

Detection devices operating in the millimeter-wave range of electromagnetic radiation, that is radiation having wavelengths in the range of 1 to 10 millimeter which corresponds to frequencies of 30 to 300 GHz, overcome some of the problems presented by detection devices using electromagnetic radiation having wavelengths in other ranges.

Specifically, millimeter-wave electromagnetic radiation can penetrate many screening materials, such as fog, smoke, carton, sheets of plastic, and clothing. Additionally, millimeter-wave detection allows for millimeter-scale detection resolution. Furthermore, with respect to millimeter-wave radiation, the attenuation and reflection characteristics of ceramic, metallic, and plastic weapons, as well as contrabands such as narcotics, are different from the characteristics of human skin, thereby enabling detection of such objects concealed on a person's body.

Publications related to the use of millimeter-wave radiation in the field of detection devices include: U.S. Pat. No. 5,073, 782; U.S. Pat. No. 5,760,397; U.S. Pat. No. 6,777,684; U.S. Pat. No. 6,950,054; U.S. Pat. No. 6,967,612; US 2005/ 0099330; US 2009/0195435 as well as the non-patent publications:

Appleby R in "Passive Millimeter-Wave Imaging and How It Differs From Terahertz Imaging," Phil Trans R Soc, London, A (2004) 362, 379-394;

Yujiri L, Shoucri M, Moffa P in "Passive Millimeter Wave Imaging," IEEE Microwave Magazine 2003, September, 39-50;

Manasson V A, Sadovnik L S, Mino R, Rodionov S in "Novel Passive Millimeter Wave Imaging System: Prototype Fabrication and Testing" Passive Millimeter-Wave Imaging Technology, Proc. SPIE Optical Engineering 2000, v. 5070, 21 April, 2-13;

Kapilevich B, Litvak B, Einat M, Shotman O in "Passive mm-Wave Sensor for Indoor and Outdoor Homeland Security Applications" Proc. 2007 International Conference on Technologies and Applications, Spain, 20-23;

Sheen D M, McMakin D L, Hall T E in "Three-Dimensional Millimeter-Wave Imaging for Concealed Weapon Detection," IEEE Transactions On Microwave Theory and Techniques 2001, v. 49, n. 9, 1581-1592;

Sheen D M, McMakin D L, Lechelt W M, Griffin J W in "Circularly Polarized Millimeter-Wave Imaging For Personnel Screening" Proc. SPIE Optical Engineering 2005, v. 5789, 21, April, 117-126;

Kapilevich B, Einat M, Litvak B, Shulsinger A, Nehemia E in "Experimental Study of Indoor mm-Wave Imaging Resolution Limits" Workshop Nefertiti-2005, Brussels, paper #111;

Boykin R D in "A Brief Overview of T-ray (THz) Imaging", DX2 Report, May 12, 2005, http://ric.uthscsa.edu/personalpages/lancaste/DI2_Projects_2005/T-Ray.pdf;

Cooper K B, Dengler R J, Chattopadhyay G, Schlecht E, Gill J, Skalare A, Mehdi I, Siegel P H in "A High-Resolution Imaging Radar at 580 GHz", IEEE microwave and wireless components letters 2008, v. 18, n. 1, January, 64-66;

Dickinson J C, Goyette T M, Gatesman A J, Joseph C S, Root Z G, Giles R H, Waldman J, Nixon W E, "Terahertz imaging of subjects with concealed weapons" Proc. SPIE 2006, vol. 6212, 62120Q01-62120Q12;

Kemp M C, Taday P F, Cole B E, Cluff J A, Fitzgerald A J, Tribe W R, "Security Applications of Terahertz Technology," Proc. SPIE 2003, v. 5070, 44-52;

Petkie D T, DeLucia F C, Casto C, Helminger P, Jacobs E L, Moyer S K, Murrill S, Halford C, Griffin S, Franck C in "Active and Passive Millimeter and Sub-Millimeter-Wave Imaging," Proc. SPIE 2005, v. 5989, 598918-1-598918-8;

Tryon G, "Passive Millimeter-Wave Object Detection and People Screening", presentation at 2007 SURA Terahertz Applications Symposium June 6-8, Washington, D.C.; and McMillan R W, Currie N C, Ferris D D, Wicks M C Jr. in "Concealed Weapon Detection Using Microwave and Millimeter Wave Sensors" Microwave and Millimeter Wave Technology Proc 1998 ICMMT'98, 1-4.

A challenge is how to practically make use of the advantages of millimeter-wave radiation in the field of detection devices.

SUMMARY OF THE INVENTION

The invention, in some embodiments, relates to the field of detection devices and more particularly, in some embodiments, to passive detection devices and methods using electromagnetic radiation having millimeter wavelengths for detection.

According to an aspect of some embodiments of the invention there is provided a method for detecting a concealed object in a region of interest on a person, comprising:

scanning the region of interest using a passive millimeter-wave detector comprising an antenna configured to receive millimeter wave radiation;

providing to a processor an output of the scanning by the detector, which output comprises a signal corresponding to an intensity of the received millimeter wave radiation;

in the processor, storing the output of the scanning;

in the processor, processing a plot corresponding to the stored output to identify whether the plot is unimodal or bimodal; and indicating a result to an operator of the detector, wherein: if the plot is bimodal, indicating to the operator that a concealed object is potentially detected.

In some embodiments, the indicating the result comprises, if the plot is unimodal, indicating to the operator that no concealed object is detected.

In some embodiments, the method further comprises calibrating the passive millimeter-wave detector by scanning an exposed portion of the person, outside the region of interest, prior to the scanning the region of interest.

In some embodiments, the passive millimeter-wave detector has dimensions and weight that allow one-handed operation.

In some embodiments, the passive millimeter-wave detector receives power from a portable power source.

In some embodiments, the antenna has a main lobe having an angular width in the range of 1 degree to 12 degrees. In some embodiments, the antenna has a main lobe having an angular width in the range of 2 degrees to 9 degrees.

In some embodiments, the antenna comprises a horn antenna. In some such embodiments, the antenna comprises a focusing lens configured to focus incoming millimeter wave radiation into the horn antenna.

In some embodiments, the intensity is of a portion of the received millimeter wave radiation having a frequency between 30 GHz and 300 GHz. In some embodiments, the intensity is of a portion of the received millimeter wave radiation having a frequency between 70 GHz and 110 GHz. In some embodiments, the intensity is of a portion of the received millimeter wave radiation having a frequency between 91 GHz and 97 GHz.

In some embodiments, the indicating that a concealed object is potentially detected comprises providing a visual indication to the operator. In some such embodiments, the visual indication is selected from a group consisting of operating a single light, operating multiple lights, continuous operation of a light, periodic operation of a light, and operation of lights in different colors.

In some embodiments, the indicating that a concealed object is potentially detected comprises providing an aural indication to the operator (in some embodiments together with a visual indication as described above and in some embodiments without a visual indication as described above). In some such embodiments, the aural indication is selected from a group consisting of a beeping sound, a buzzing sound, a continuous sound, a periodic sound, a soothing sound, and a bell sound.

In some embodiments, the indicating that a concealed object is potentially detected comprises providing a tactile indication to the operator (in some embodiments together with a visual and/or aural indication as described above, in some embodiments without one or both of visual and/or aural indication as described above). In some such embodiments, the tactile indication comprises vibration.

In some embodiments, the indicating that no concealed object was detected comprises providing a visual indication to the operator. In some such embodiments, the visual indication is selected from a group consisting of operating a single light, operating multiple lights, continuous operation of a light, periodic operation of a light, and operation of lights in different colors.

In some embodiments, the indicating that no concealed object was detected comprises providing an aural indication to the operator (in some embodiments together with a visual indication as described above and in some embodiments without a visual indication as described above). In some such embodiments, the aural indication is selected from a group consisting of a beeping sound, a buzzing sound, a continuous sound, a periodic sound, a soothing sound, and a bell sound.

In some embodiments, the indicating that no concealed object was detected comprises providing a tactile indication to the operator (in some embodiments together with a visual and/or aural indication as described above, in some embodiments without one or both of visual and/or aural indication as described above). In some such embodiments, the tactile indication comprises vibration.

In some embodiments, the method also comprises providing to the operator an indication of the intensity of the received millimeter wave radiation. In some such embodiments, the indication is provided at an indicating rate. In some embodiments, the providing the indication of the intensity comprises using a plurality of lights, and activating a fraction of the plurality of lights in order to provide indication to the operator, wherein the size of the fraction corresponds to the intensity.

In some embodiments, the method further comprises, during the scanning, projecting a visible light indicating to the operator an area in the region of interest from which millimeter wave radiation is currently being received by the antenna. In some such embodiments, the projecting comprises projecting visible light marking the center of the area. In some such embodiments, the projecting comprises projecting visible light forming a light cone having an angular width corresponding to an angular width of a main lobe of the antenna and illuminating an area substantially overlapping the area. In some such embodiments, the projecting comprises projecting multiple beams of light which impinge on the region of interest to produce a plurality of light spots delineating the borders of the area.

In some embodiments, the processing comprises:
defining first, second, and third thresholds:
the first threshold corresponding to an intensity level which is above a background intensity level,
the second threshold corresponding to an intensity level which is below an intensity level received from an exposed area on the person, and
the third threshold corresponding to an intensity level which is a less than the second threshold and greater than the first threshold and is considered to be above an intensity level received from an area on the person where a concealed object is suspected; and
identifying a relationship between the plot and the first, second, and third thresholds, wherein:
if during the scanning, the plot rises above the first threshold and the second threshold, subsequently drops below the third threshold, subsequently rises above the second threshold, and subsequently drops below the first threshold, identifying the plot as bimodal.

In some such embodiments, the identifying the relationship comprises: if during the scanning the plot rises above the first threshold and the second threshold, and subsequently drops below the second threshold and below the first threshold, without dropping below the third threshold, identifying the plot as unimodal. In some such embodiments, the third threshold is set to 80% of the second threshold. In some such embodiments, the third threshold is set to 90% of the second threshold. In some embodiments, the level of the third threshold may be adjusted by the operator, based on at least one of the expected concealed object, environmental conditions, and detection resolution.

According to an aspect of some embodiments of the invention there is also provided a passive millimeter wave detector, comprising:
  a directional antenna configured to receive millimeter wave radiation having an intensity from a region of interest, and to output an electrical signal having an amplitude corresponding to the intensity;
  a high-frequency amplifier functionally associated with the directional antenna and configured to receive the electrical signal, to modulate the electrical signal using a modulating signal, to amplify components of the electrical signal having high frequency, and to provide as output an amplified modulated signal corresponding to the electrical signal having amplified high frequency components;
  a high-frequency detector functionally associated with the high-frequency amplifier and configured to receive the amplified modulated signal, to restore the modulating signal, and to provide as output a demodulated electrical signal corresponding in amplitude to the amplitude of the electrical signal;
  a low-frequency amplifier functionally associated with the high-frequency detector and configured to receive the demodulated electrical signal, to amplify components of the demodulated electrical signal having low-frequency, and to provide as output a signal having an amplitude corresponding to the amplitude of the demodulated electrical signal, in digital format; and
  an intensity indicator functionally associated with the low-frequency amplifier and configured to receive the signal in the digital format and to indicate the intensity of the received millimeter wave radiation.

In some embodiments, the detector has dimensions and weight that allow it to be operated as a hand-held device. In some such embodiments, the detector can be operated using one hand.

In some embodiments, the detector receives power from a portable power source.

In some embodiments, the antenna has a main lobe having an angular width in the range of 1 degree to 12 degrees. In some embodiments, the antenna has a main lobe having an angular width in the range of 2 degrees to 9 degrees.

In some embodiments, the antenna comprises a horn antenna. In some such embodiments, the antenna comprises a focusing lens configured to focus incoming millimeter wave radiation into the horn antenna.

In some embodiments, the high-frequency amplifier is configured to amplify components of the electrical signal received from the antenna having frequencies of 70 GHz and higher. In some embodiments, the high-frequency amplifier is configured to amplify components of the electrical signal received from the antenna having frequencies of 91 GHz and higher.

In some embodiments, the low-frequency amplifier is configured to amplify components of the electrical signal received from the antenna having frequencies up to 110 GHz. In some embodiments, the low-frequency amplifier is configured to amplify components of the electrical signal received from the antenna having frequencies up to 97 GHz.

In some embodiments, the high-frequency amplifier comprises:
  a pulse generator configured to generate a modulating signal;
  a PIN switch configured to receive the electrical signal from the antenna and the modulating signal from the pulse generator, and to modulate the electrical signal using the modulating signal to provide a modulated electrical signal;
  an isolator configured to receive the modulated electrical signal and to provide band matching of the modulated electrical signal; and
  a low noise amplifier (LNA) configured to receive the modulated electrical signal following the band matching and to amplify the modulated electrical signal.

In some such embodiments, the modulating signal comprises a 1 KHz signal and the modulated electrical signal comprises a 1 KHz modulated electrical signal.

In some embodiments, the low-frequency amplifier comprises:
  a low pass filter configured to filter the received low-frequency signal to provide a filtered low-frequency signal;
  a video amplifier configured to amplify the filtered low-frequency signal to provide an amplified low-frequency signal; and
  an active band pass filter configured to filter the amplified low-frequency signal thereby to improve the noise performance of the detector.

In some such embodiments, the low pass filter comprises a 30 KHz low pass filter. In some such embodiments, the active band pass filter comprises a 1 KHz band pass filter.

In some embodiments, the intensity indicator comprises a plurality of lights, and is configured to indicate the intensity by activating a fraction of the plurality of lights, wherein the size of the fraction corresponds to the intensity.

In some embodiments, the detector also comprises a processor, functionally associated with the low-frequency amplifier and with the intensity indicator, and configured to:
  during a period of time receive and store the output signal of the low-frequency amplifier in the digital format;
  identify whether a plot of the stored output signal in the second format is unimodal or bimodal; and
  provide an indication to an operator of the detector, wherein:
    if the plot is bimodal, the indication indicates the detection of a suspected concealed object.

In some such embodiments, if the plot is unimodal, the indication indicates the absence of a concealed object.

In some embodiments, the processor is configured to:
  define first, second, and third thresholds:
    the first threshold corresponding to an intensity level which is above a background intensity level,
    the second threshold corresponding to an intensity level which is below an intensity level received from an exposed area on the person, and
    the third threshold corresponding to an intensity level which is a less than the second threshold and greater than the first threshold and is considered to be above an intensity level received from an area on the person where a concealed object is suspected; and
  identify a relationship between the plot and the first, second, and third thresholds, wherein:
    if during the scanning the plot rises above the first threshold and the second threshold, subsequently drops below the third threshold, subsequently rises above the second threshold, and finally drops below the first threshold, identify the plot as bimodal.

In some such embodiments, if during the scanning the plot rises above the first threshold and the second threshold, and subsequently drops below the second threshold and below the first threshold, without dropping below the third threshold, the processor is configured to identify the plot as unimodal. In some such embodiments, the processor is configured to set the third threshold to 80% of the second threshold. In some such embodiments, the processor is configured to set the third threshold to 90% of the second threshold. In some embodiments, the level of the third threshold is set by the operator, based on at least one of the expected concealed object, environmental conditions, and detection resolution.

In some embodiments, the processor is configured to provide the indication using the intensity indicator. In some embodiments, the indication comprises a visual indication. In some embodiments, the indication comprises an aural indication. In some embodiments, the indication comprises a tactile indication.

In some embodiments, the detector also comprises at least one directional light source configured, during operation of the antenna, to project visible light indicating an area in the region of interest from which millimeter wave radiation is currently being received by the antenna. In some embodiments, the at least one directional light source comprises a single light source projecting a beam of light generally parallel to an axis of a main lobe of the antenna and marking a center of the area. In some embodiments, the at least one directional light source comprises a flash light including a reflector projecting light forming a light cone having an angular width corresponding to an angular width of a main lobe of the antenna and illuminating an area substantially overlapping the area.

In some embodiments, the at least one directional light source comprises multiple light sources projecting multiple beams of light which impinge on the region of interest to produce light spots delineating the borders of the area. In some such embodiments, the multiple light sources are mounted above a periphery of the antenna. In some such embodiments, the multiple beams of light are divergent from an axis of a main lobe of the antenna. In some such embodiments, the multiple beams of light are divergent from an axis of a main lobe of the antenna by half the angular width of the main lobe of the antenna.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

As used herein, the indefinite articles "a" and "an" mean "at least one" or "one or more" unless the context clearly dictates otherwise.

BRIEF DESCRIPTION OF THE FIGURES

Some embodiments of the invention are described herein with reference to the accompanying figures. The description, together with the figures, makes apparent to a person having ordinary skill in the art how some embodiments of the invention may be practiced. The figures are for the purpose of illustrative discussion and no attempt is made to show structural details of an embodiment in more detail than is necessary for a fundamental understanding of the invention. For the sake of clarity, some objects depicted in the figures are not to scale.

In the Figures.

DESCRIPTION OF SOME EMBODIMENTS OF THE INVENTION

Figure 1:
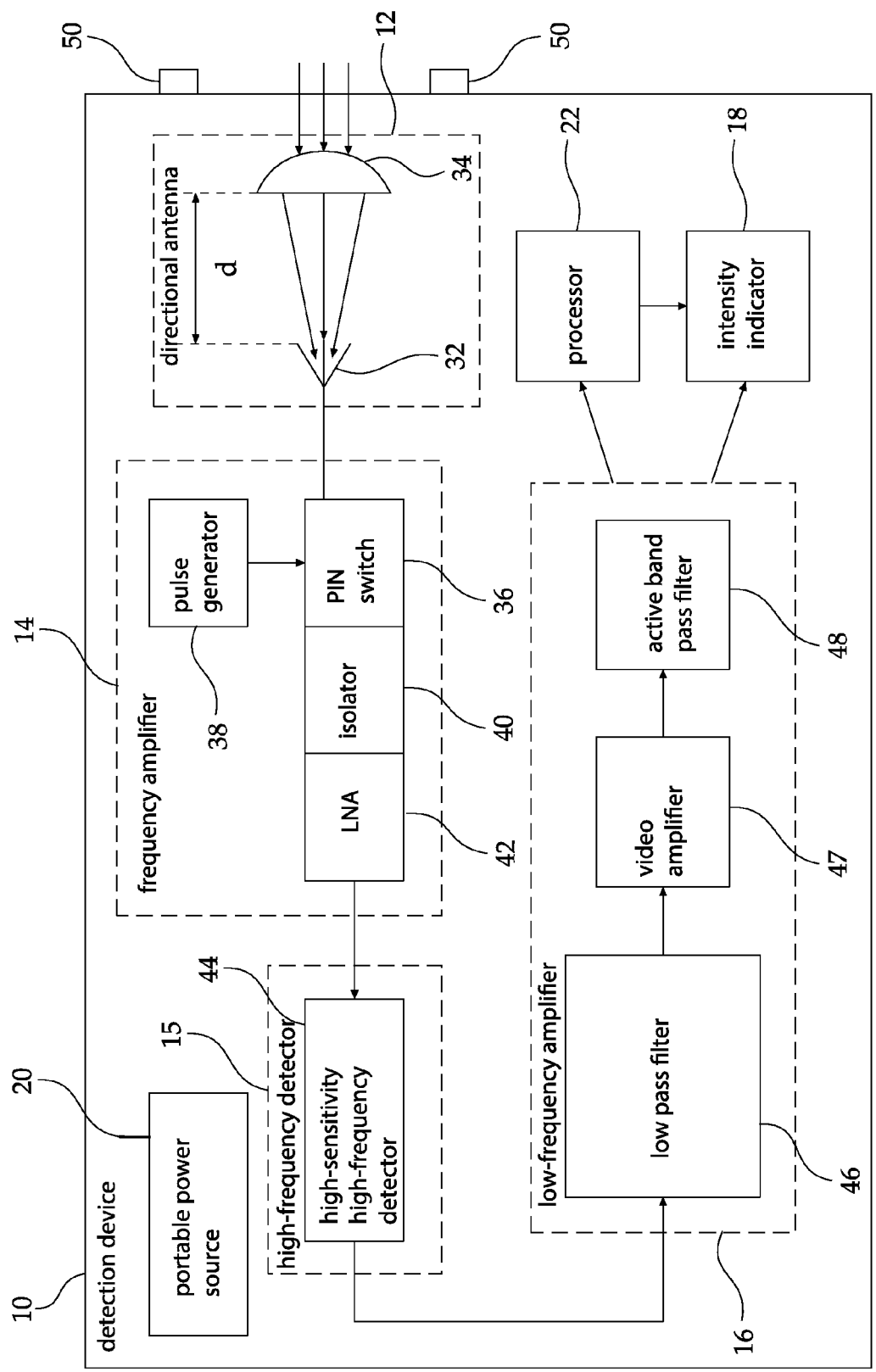
FIG. 1 is a schematic depiction an embodiment of a detection device according to the teachings herein.

The invention, in some embodiments thereof, relates to passive methods and devices for detection of concealed objects, such as weapons, explosives, and contraband materials, using millimeter-wave radiation.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment in detail, it is to be understood that the invention is not necessarily limited in its application to the details of construction and the arrangement of the components and/or methods set forth herein. The invention is capable of other embodiments or of being practiced or carried out in various ways. The phraseology and terminology employed herein are for descriptive purpose and should not be regarded as limiting.

In accordance with the teachings herein, and as will be described in further detail hereinbelow, a concealed object can be detected by receiving and analyzing the intensity of millimeter waves emitted from a location where the concealed object is suspected to be. For example, in accordance with some embodiments of the teachings herein, millimeter waves can be used to detect an object of lossy plastic, that is plastic that is not electrically isolating thereby capable of conducting electric current, such as typical explosives, or an object of metal carried by a person and concealed beneath clothing.

Additionally, it is appreciated that the intensity of millimeter waves emitted by a clothed person under "normal conditions", e.g., at an airport or along a road, is sufficient to be easily detected at useful distances (100 to 400 cm) and differentiated from the background using a passive millimeter-wave detector in accordance with the teachings herein as described hereinbelow, for example with reference to FIG. 1.

As is further described hereinbelow, Applicant has found that typical concealed objects of interest in the field of security, including metal objects such as knives and guns or plastic explosives, are sufficiently large and emit an intensity of millimeter-waves that is sufficiently different from of a living body that such objects are easily detectable using embodiments of a passive millimeter-wave detector according to the teachings herein, even when concealed beneath clothing.

Thus, according to an aspect of some embodiments of the invention there is provided a method for detecting a concealed object in a region of interest on a person, comprising:

scanning the region of interest using a passive millimeter-wave detector comprising an antenna configured to receive millimeter wave radiation;

providing to a processor an output of the scanning by the detector, which output comprises a signal corresponding to an intensity of the received millimeter wave radiation;

in the processor, storing the output of the scanning;

in the processor, processing a plot corresponding to the stored output to identify whether the plot is unimodal or bimodal; and indicating a result to an operator of the detector, wherein:
if the plot is bimodal, indicating to the operator that a concealed object is potentially detected.

According to an aspect of some embodiments of the invention there is also provided a passive millimeter wave detector, comprising:

a directional antenna configured to receive millimeter wave radiation having an intensity from a region of interest, and to output an electrical signal having an amplitude corresponding to the intensity;

a high-frequency amplifier functionally associated with the directional antenna and configured to receive the electrical signal, to modulate the electrical signal using a modulating signal, to amplify components of the electrical signal having high frequency, and to provide as output an amplified modulated signal corresponding to the electrical signal having amplified high frequency components;

a high-frequency detector functionally associated with the high-frequency amplifier and configured to receive the amplified modulated signal, to restore the modulating signal, and to provide as output a demodulated electrical signal corresponding in amplitude to the amplitude of the electrical signal;

a low-frequency amplifier functionally associated with the high-frequency detector and configured to receive the demodulated electrical signal, to amplify components of the demodulated electrical signal having low-frequency, and to provide as output a signal having an amplitude corresponding to the amplitude of the demodulated electrical signal, in digital format; and an intensity indicator functionally associated with the low-frequency amplifier and configured to receive the signal in the digital format and to indicate the intensity of the received millimeter wave radiation.

Reference is now made to FIG. 1, which is a schematic depiction an embodiment of a detection device according to the teachings herein.

As seen in FIG. 1, a detection device 10 comprises a directional antenna 12, a high-frequency amplifier 14, a high-frequency detector 15, a low-frequency amplifier 16, an intensity indicator 18, a portable power source 20, and a processor 22. Device 10 is portable, having dimensions and weight allowing device 10 to be held and operated with one hand.

Directional antenna 12 is configured to receive millimeter-wave radiation and to output a high-frequency electric signal having an amplitude corresponding to the intensity of the received radiation.

In some embodiments, directional antenna 12 comprises a horn antenna 32, such as a SGH-10-RP000 Standard Gain pyramidal horn commercially available from Millitech Inc. of Northampton, Mass., USA.

In some embodiments, the directional antenna of a device as described herein is configured to receive millimeter wave radiation having wavelengths in the range of 1 to 10 mm. That said any spectral band of millimeter waves useful for detecting concealed objects can be used in implementing embodiments of the teachings herein.

In some embodiments, the directional antenna is configured to receive radiation in a broad spectral band, but the device is configured to use (for the detection of concealed objects) millimeter-wave radiation in the spectral band of 70 GHz-110 GHz, which corresponds to wavelengths in the range of 2.7 mm-4.4 mm. In some embodiments of the detection devices described herein, the directional antenna is configured to receive radiation in a broad spectral band, but the device is configured to use (for the detection of concealed objects) millimeter-wave radiation in the spectral band of 91 GHz-97 GHz, which corresponds to wavelengths in the range of 3.1 mm-3.3 mm.

Typically, a specific embodiment of a device is configured to advantageously detect concealed objects at some specified distance. For example, for some typical homeland security embodiments, it is preferred to use a device as described herein to detect concealed objects carried by a person at a range of between 1.5 meters to about 2.5 meters. Specifically, when trying to detect objects at a distance greater than 2.5 meters, any small motion of the hand of the operator, such as normal shaking of the hand, potentially impacts detection ability. On the other hand, use of the device at distances less than 1.5 meters may cause a security threat for the operator of the device, due to the need to let a possibly armed person get within 1.5 meters of the operator.

In some embodiments, it is preferred that during use, directional antenna 12 receive a signal from a signal-receiving area of between 78 cm$^2$ (corresponding to a circle having a 10 cm diameter) and 706 cm$^2$ (corresponding to a circle having a 30 cm diameter) and in some embodiments an area of between 78 cm$^2$ and 314 cm$^2$ (corresponding to a circle having a 20 cm diameter). A smaller signal receiving area potentially gives more "false positive" detection due to a greater sensitivity to operator hand-motion and detection of small objects held by a person that are not dangerous. A larger signal receiving area potentially gives more "false negative" detection due to less sensitive to small concealed objects that are potentially dangerous.

Accordingly, in some embodiments, the angular width of a main lobe of directional antenna 12 is between about 12 degrees, which correspond to a circular signal-receiving area of approximately 30 cm in diameter at a range of 1.5 meters, and about 2.3 degrees, which correspond to a circular signal-receiving area of approximately 10 cm in diameter at a range of 2.5 meters. In some such embodiments, the angular width of the main lobe of antenna 12 is between about 8.6 degrees, which correspond to a circular signal-receiving area of approximately 30 cm in diameter at a range of 2.0 meters, and about 2.9 degrees, which correspond to a circular signal-receiving area of approximately 10 cm in diameter at a range of 2.0 meters.

In some embodiments, directional antenna 12 also includes a focusing lens 34, such as a fluorinated hydrocarbon (Teflon®) lens. In some such embodiments, lens 34 is positioned at a distance d from horn antenna 32, thereby focusing incoming radiation into horn antenna 32.

In some embodiments, the angular width of the main lobe of an antenna of a detection device as described herein is fixed. That said, in some embodiments, the angular width of the main lobe of an antenna of a detection device as described herein is user-changeable, for example as in device 10, where the angular width of the main lobe of antenna 12 can be changed by changing the distance d between horn antenna 32 and lens 34. An advantage of a detection device having an antenna with a user-changeable main lobe angular width allows selecting an angular width suitable for the range at which the device is used to maintain a desired signal receipt circle, as described below. For example, when such a device is used at a long range (e.g., 8-10 meters), the angular width of the main lobe of the antenna is changed to be smaller than when the device is used at a short range (e.g., 1.5-2 meters). In some embodiments, an antenna includes a main-lobe changing mechanism allowing a user to change the angular width of the main lobe of the antenna. For example, in some embodiments, a main-lobe changing mechanism of an antenna 12 includes rails on which a lens such as 34 is moveably mounted relative to a horn antenna such as 32, and also includes a screw mechanism (rotatable using a manual crank or by activating an associated electrical motor). Depending on the direction of rotation of the screw mechanism, the distance d between the horn antenna and the lens is increased or decreased as desired, changing the angular width of the main lobe of the antenna.

High-frequency amplifier 14 is functionally associated with antenna 12. Specifically, high-frequency amplifier 14 receives, as its input, a high-frequency signal corresponding to the radiation received by antenna 12, and amplifies high-frequency components of the signal relative to low-frequency components of the signal.

In some embodiments, high-frequency amplifier 14 comprises a PIN switch 36, such as a RSP-10-RWASH SPST PIN switch, commercially available from Millitech Inc. of Northampton, Mass., USA, and a pulse generator 38. In some embodiments, amplifier 14 further comprises an isolator 40, such as a FBI-10-RSES0 isolator 40, commercially available from Millitech Inc. of Northampton, Mass., USA, and a low noise amplifier (LNA) 42, such as a QLN-9404028-I32 W-band low-noise amplifier (LNA), commercially available from QuinStar Technology Inc. of Torrance, Calif., USA.

In some such embodiments, the high-frequency signal received from antenna 12 is modulated in PIN switch 36 by a 1 KHz signal provided by pulse generator 38. The output of PIN switch 36, which is a modulated signal, passes through isolator 40 to LNA 42. LNA 42 amplifies the modulated signal, thereby producing as the output of high-frequency amplifier 14 an amplified, high-frequency, 1 KHz-modulated signal.

high-frequency detector 15 is functionally associated with high-frequency amplifier 14.

In some embodiments, high-frequency detector 15 comprises a high sensitivity high-frequency detector 44, such as a DXW-10-SFAS0 high sensitivity high-frequency detector, commercially available from Millitech Inc. of Northampton, Mass., USA.

In some embodiments, high-frequency detector 15 receives as input the amplified, high-frequency, 1 KHz modulated signal which is the output of high-frequency amplifier 14. The received signal is detected, such as by detector 44, to restore the modulating 1 KHz signal, which modulating signal has an amplitude corresponding to the intensity of the high-frequency signal received by antenna 12. High-frequency detector 15 produces as its output a low-frequency signal having an amplitude corresponding to the amplitude of the high-frequency input signal.

Low-frequency amplifier 16 is functionally associated with high-frequency detector 15.

In some embodiments, low-frequency amplifier 16 comprises a low pass filter 46 and a video amplifier 47. In some such embodiments, low pass filter 46 is a 30 KHz low pass filter. A combined low pass filter and video amplifier is commercially available from Frequency Devices Inc. of Ottawa, Ill., USA as a D-70 component.

In some embodiments, low-frequency amplifier 16 further comprises an active band pass filter 48, which is preferably a 1 KHz band pass filter.

In use, low-frequency amplifier 16 receives as its input signal the output signal of high-frequency detector 15. The received signal passes through low pass filter 46, is amplified in amplifier 47, and is then filtered in filter 48, to improve the noise performance of device 10. Low-frequency amplifier 16 amplifies low-frequency components of the signal relative to high-frequency components of the signal and thus produces as an output a signal, having an amplitude corresponding to the amplitude of the low-frequency input signal, in a format readable by intensity indicator 18 and by processor 22.

Intensity indicator 18, which may be, for example, a Light Emitting Diode (LED) display, or any other suitable, visual, aural, tactile (or combination of two or more thereof) indicator, is functionally associated with low-frequency amplifier 16.

In some embodiments, intensity indicator 18 receives as its input the output signal from low-frequency amplifier 16 and indicates the relative amplitude of the signal. Due to the relationship between the relative intensity of the millimeter waves received by antenna 12 and the amplitude of the output signal of low-frequency amplifier 16, intensity indicator 18 is an effective indicator for the relative intensity of the radiation received by antenna 12. In some such embodiments, greater signal amplitude is indicated by a greater number of activated LEDs.

In some embodiments, intensity indicator 18 is configured to indicate the absence or presence of a concealed object, as described in further detail hereinbelow.

Processor 22 is a digital processor functionally associated with low-frequency amplifier 16 and with intensity indicator 18.

In some embodiments, the output of low-frequency amplifier 16, having amplitude corresponding to the intensity of the high-frequency signal received by antenna 12, is input to processor 22 which processes and analyzes the signal. Specifically, processor 22 continuously receives the output signal from low-frequency amplifier 16, for example in digital format, and stores in a memory (not shown) a value corresponding to the relative amplitude of the received signal at a predetermined rate. In some embodiments, processor 22 stores the received signals continuously. In some embodiments, processor 22 stores the received signals periodically. In some embodiments, processor 22 stores the received signals intermittently.

In some embodiments, processor 22 analyzes a waveform defined by the stored values as a function of time. If the waveform corresponding to the monitored intensity has unimodal behavior, i.e., substantially monotonously increases, subsequently optionally remains substantially constant, and then substantially monotonously decreases, with no substantial drop in intensity, processor 22 optionally indicates the absence of a concealed object. On the other hand, if the waveform corresponding to the monitored intensity has bimodal behavior, i.e., substantially monotonously increases, optionally subsequently remains substantially constant, and then substantially monotonously decreases but includes a substantial drop in intensity in the constant portion, as schematically depicted in FIG. 3B, processor 22 indicates the possibility that a concealed object has been detected.

In some embodiments, the output of processor 22 is input to indicator 18. In some such embodiments, if a unimodal waveform was detected by processor 22, indicator 18 indicates the absence of a concealed object, such as by rapidly blinking on and off a single LED, and if a bimodal waveform was detected by processor 22, indicator indicates the suspected presence of a concealed object, such as by rapidly blinking of all the LEDs of the indicator. That said any suitable type of indication (visual, aural, tactile or combinations thereof) may be used. In some embodiments, a green light indicates absence of a concealed object and a red light indicates the presence of such an object. In some embodiments, continuous illumination from one or more light sources indicates the absence of a concealed object, and flashing, blinking, periodic, or intermittent illumination indicates the presence of a concealed object.

In some embodiments, indicator 18 includes a speaker (not depicted in FIG. 1) in addition or instead of a light, which provides an aural indication in response to the output of processor 22. For example, upon detection of a unimodal waveform, the speaker may output a single beep, indicating the absence of a concealed object, and upon detection of a bimodal waveform, the speaker may output a long buzzing sound, indicating the suspected presence of a concealed object. However, any suitable aural indication may be used, such as a buzzing sound, a beeping sound, a soothing sound, a continuous sound, a periodic sound, and a bell sound.

In some embodiments, indicator 18 includes a tactile indication provider (not depicted in FIG. 1) in addition or instead of a light and in addition or instead of a speaker, which provides a tactile indication in response to the output of processor 22. In some such embodiments, the tactile indication comprises vibration.

Power for operating device 10 is provided by any suitable power source. That said, the fact that the device is a passive device that uses little power allows, in some embodiments, for the practical use of portable power source 20. In some embodiments, the portable power source 20 comprises rechargeable batteries known in the art of portable devices, such as NiMH or lithium ion batteries.

In some embodiments, device 10 further includes at least one directional light source 50, mounted so as to project visible light indicating at least an approximate location of the main lobe of the antenna 12.

In some embodiments, directional light source 50 is a single laser, projecting light generally in parallel to the main lobe of antenna 12 and marking a spot near the center of the area from which the antenna 12 receives radiation at a certain range, e.g., 200 cm.

In some embodiments directional light source 50 is a light source, such as a flashlight, including a reflector, forming a light cone having an angular width corresponding to that of the main lobe of antenna 12 and illuminating an area substantially overlapping the area from which antenna 12 receives radiation at a certain range, e.g., 200 cm. In other words, the light cone generally overlaps a cone forming the field of view of antenna 12.

In some embodiments directional light source 50 comprises multiple lasers, for example eight class 1 lasers, mounted about the periphery of antenna 12 and projecting eight laser beams, each individual beam being slightly divergent from the axis of main lobe of antenna 12. In some such embodiments, each individual laser projects light which is divergent from the axis of the main lobe of antenna 12 by half the angular width of the main lobe of antenna 12, for example between 3° and 6°. In some such embodiments, when directional light source 50 is activated, the laser beams projected from the lasers produce light spots delineating a circle on the target, thereby indicating to an operator of device 10 the area at which the main lobe of antenna 12 is directed and from which radiation is received.

Figure 2A:
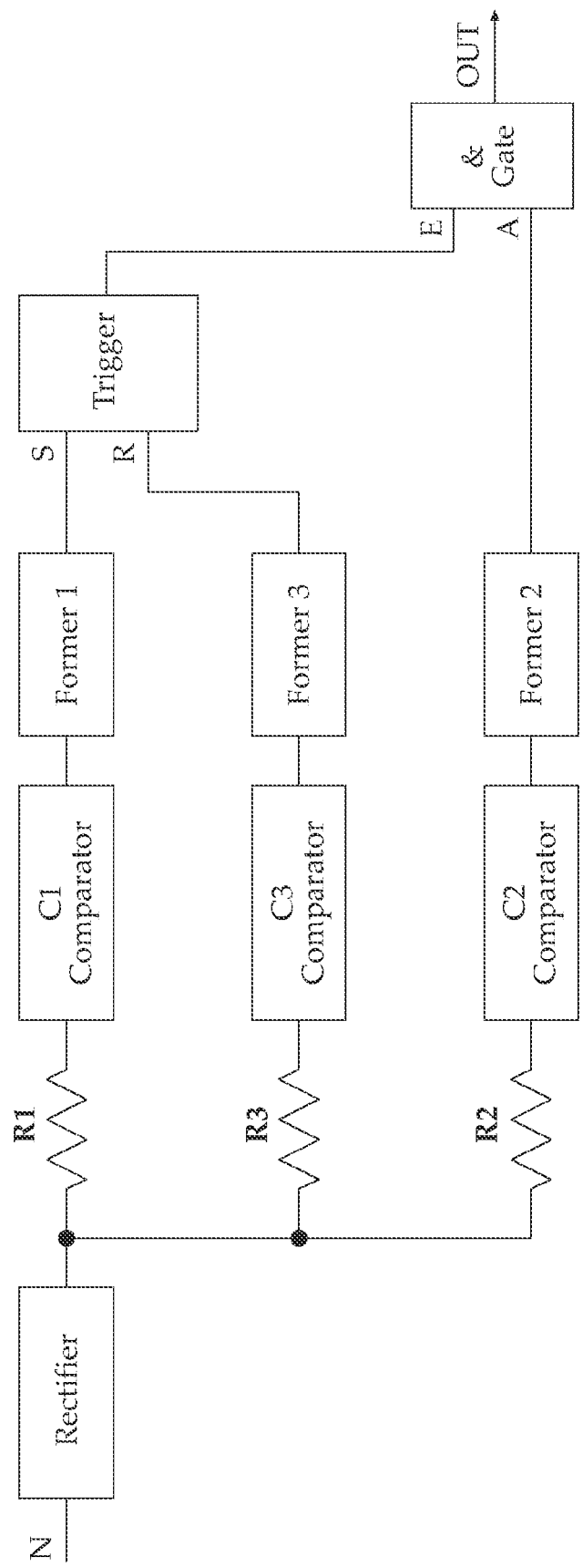
FIG. 2A is a block diagram depiction of a circuit for operating a processor forming part of the detection device of FIG. 1 according to the teachings herein.
Figure 2B:
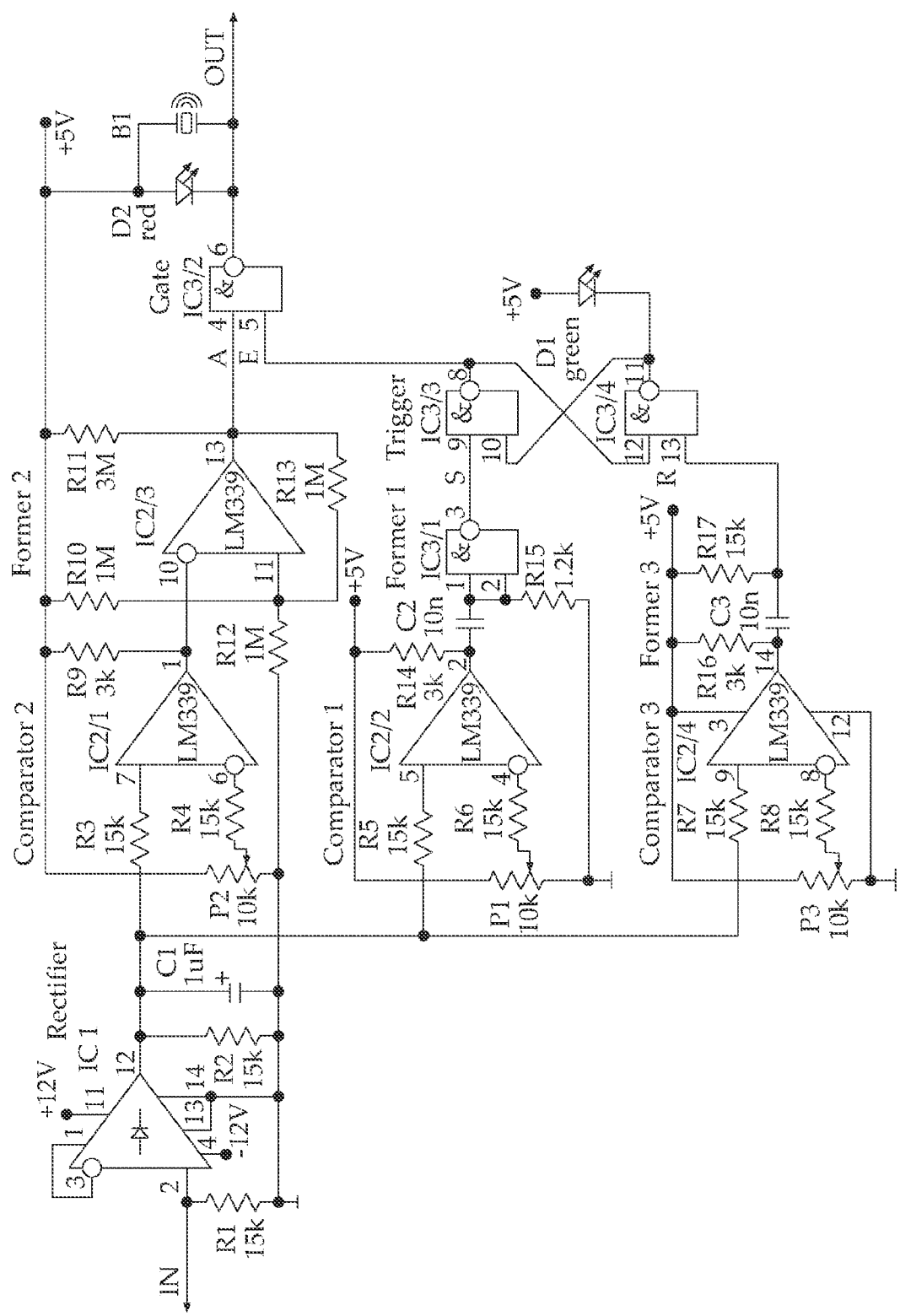
FIG. 2B is a schematic depiction of an embodiment of an electrical circuit implementing the circuit of FIG. 2A according to the teachings herein.

Reference is now made to FIG. 2A, which is a block diagram depiction of a circuit for operating a processor forming part of the detection device of FIG. 1 according to the teachings herein, and to FIG. 2B, which is a schematic depiction of an embodiment of an electrical circuit implementing the circuit of FIG. 2A according to the teachings herein. It is appreciated that the implementations shown in FIGS. 2A and 2B are merely examples, illustrating one way of implementing a processor, such as processor 22 of the device of FIG. 1 to enable detection of concealed objects as described hereinbelow with reference to FIGS. 3A and 3B. That said any other suitable implementation is considered to be in the scope of the teachings herein.

Figure 3A:
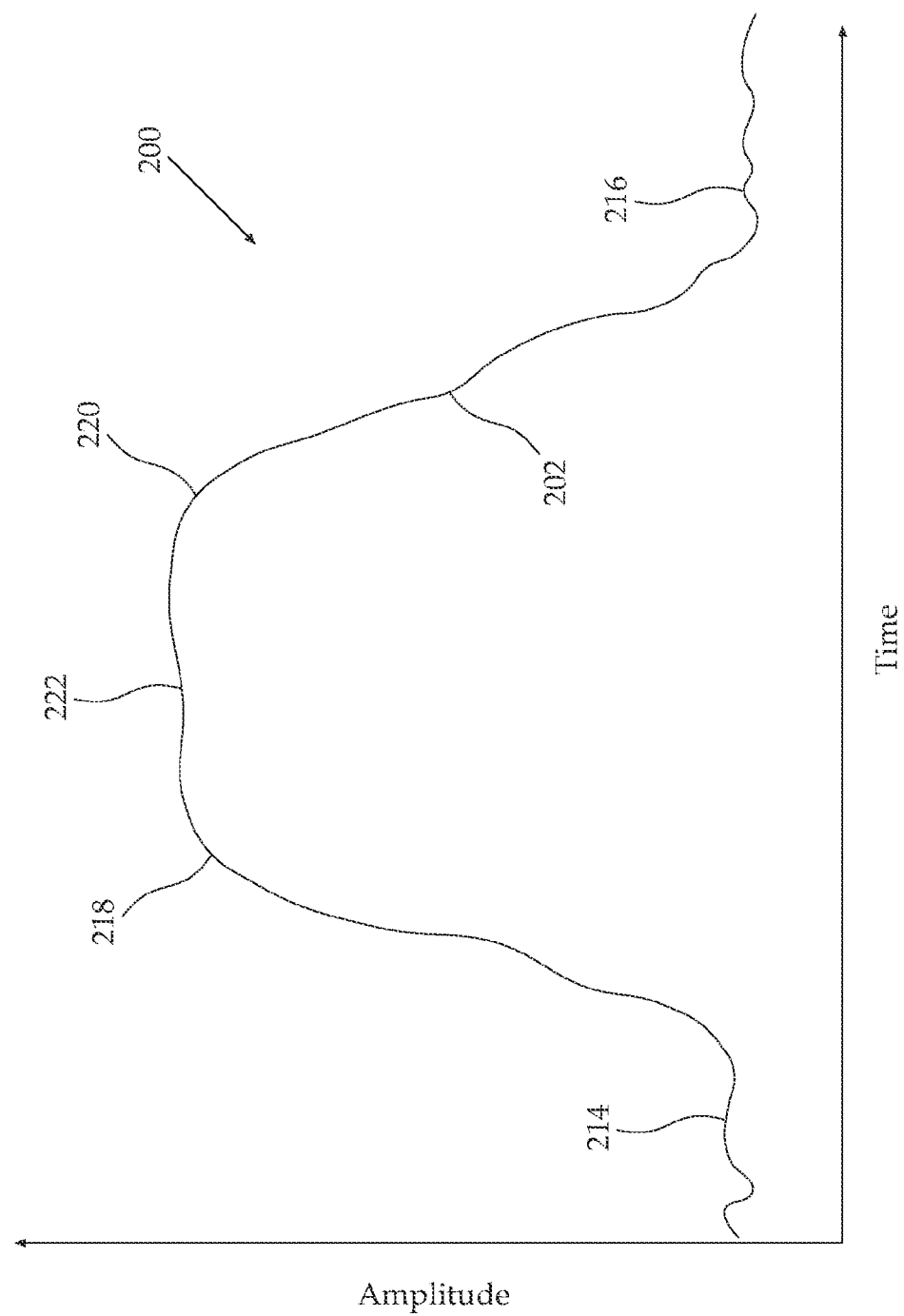
FIGS. 3A and 3B are graphical depiction of two plots representing scanned radiation measurements using the detection device of FIG. 1 according to the teachings herein.
Figure 3B:
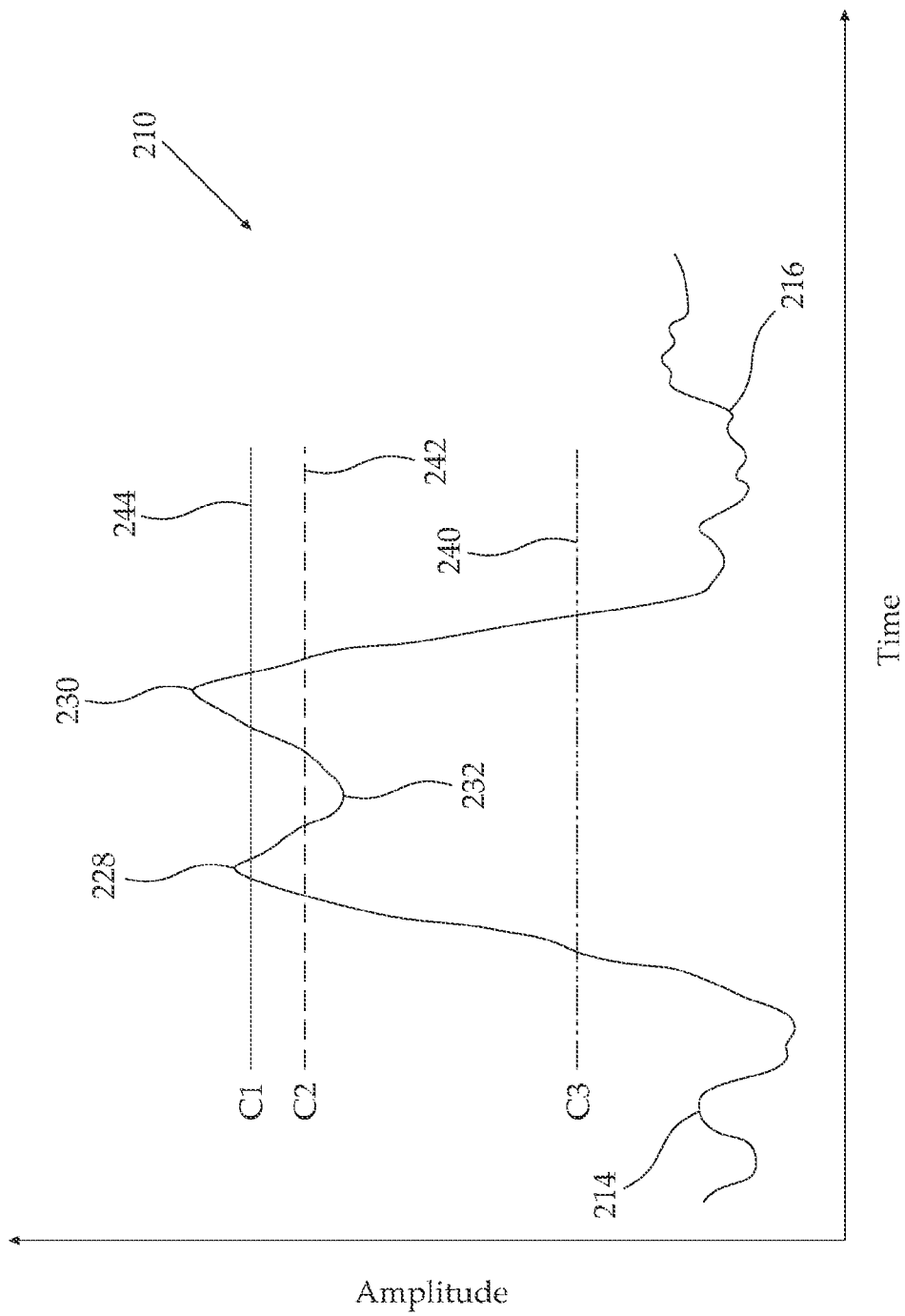

Reference is now made to FIGS. 3A and 3B, which are graphical depiction of two plots representing scanned radiation measurements using the detection device of FIG. 1 according to the teachings herein.

According to an aspect of some embodiments, a method is provided for comparing amplitude values obtained in various time points to one another, thereby allocating an identifiable time-dependent variation of the amplitude signal, and more specifically, for concluding, if the amplitude has unimodal behavior with no substantial drop in amplitude, that no concealed object has been detected in the region of interest; and if the modulating amplitude has bimodal behavior including a substantial drop in amplitude, concluding that the substantial drop in amplitude indicates detection of an concealed object in the region of interest.

As seen in FIG. 3A, a graph 200 includes a plot 202 of time-dependent amplitude signals, corresponding to the intensity of received radiation, of a single scan of a main lobe of a directional antenna, such as antenna 12 of device 10 of FIG. 1, over a body of a person. Plot 202 is a unimodal plot, representing a typical result of a measurement during which the "target" clothed person within the region of interest is not carrying a concealed object.

In FIG. 3B, a graph 210 includes a plot 212 of time-dependent amplitude signals, corresponding to the intensity of received radiation, of a single scan of a main lobe of a directional antenna, such as antenna 12 of device 10 of FIG. 1, over a body of a person. Plot 212 is a bimodal plot, representing a typical result of a measurement during which the "target" clothed person within the region of interest carries an object obscured underneath clothing.

As seen, both plots 202 and 212 have a left margin 214 and a right margin 216 having relatively low amplitudes, corresponding to low radiation intensity from the background clutter areas and not related to the body of the scanned person.

Turning specifically to plot 202 in FIG. 3A, from left to right, plot 202 rises from left margin 214 to reach a left peak 218 corresponding to the radiation intensity received from the body. Further to the right, plot 202 reaches a right peak 220 from which the plot drops back to right margin 216.

The rise in plot 202 between left margin 214 and left peak 218 corresponds to an increase in the portion of the field of view of the antenna directed at the target person, until the entire field of view of the antenna is directed at the target person and receives radiation therefrom. In a corresponding manner, the drop in plot 202 between right peak 220 and right margin 216 corresponds to a decrease in the portion of the field of view of the antenna directed at the target person.

Center 222 of plot 202 has a plateau, corresponding to a substantially constant intensity of radiation detected from the body of the target-person and indicating a substantially unchanging intensity of radiation detected from successive areas covered in the scan. Subsequently plot 202 forms a substantially unimodal function, that in some embodiments is indicative of absence of a concealed object.

Turning now to plot 212 in FIG. 3B, from left to right, plot 212 rises from left margin 214 to reach a left peak 228 corresponding to the radiation intensity received from the body. Further to the right, plot 212 reaches a right peak 230 from which the plot drops back to right margin 216.

As described hereinabove with reference to plot 202, the rise in plot 212 between left margin 214 and left peak 228 corresponds to an increase in the portion of the field of view of the antenna directed at the target person, until the entire field of view of the antenna is directed at the target person and receives radiation therefrom. In a corresponding manner, the drop in plot 212 between right peak 230 and right margin 216 corresponds to a decrease in the portion of the field of view of the antenna directed at the target person.

As seen, the center of plot 212 between left peak 228 and right peak 230 comprises a dip 232, corresponding to a drop in the intensity of radiation detected from the body of the target-person and indicating the possible presence of a concealed object having a lower emissivity or a lower temperature than that of the body of the target person. Subsequently plot 212 is substantially bimodal, that in some embodiments is indicative of possible presence of a concealed object. Such a concealed object may be, for example, a mobile phone, a weapon such as a gun or knife, or explosives.

According to an aspect of some embodiments, a method is provided for identifying a variation of the amplitude signal indicative of the possible presence of a concealed object. A distinct variation from a plateau of the amplitude signal is identified by a signal decrease followed by a signal increase such as dip 232 in plot 212. Conversely, a signal increase followed by a signal decrease (a "bump") identifies a region of higher temperature or higher emissivity from the surroundings. In some embodiments such identification of a dip or a "bump" of the amplitude signal is performed by a processor such as processor 22 of device 10.

As seen in FIG. 3B, graph 210 further depicts three thresholds, 240 (C3), 242 (C2) and 244 (C1). Threshold 240 (C3) is tuned and set at a higher level than the background level of margins 214 and 216 which is measured for example by receiving radiation from the background. Threshold 244 (C1) is tuned and set at a lower level than the left peak 228 and right peak 230 representing radiation intensity from a body of a person, and which can be measured by receiving radiation from a body part which is not obscured (e.g., the head). Threshold 242 (C2) is set higher than the lowest point in dip 232 and is may be set or adjusted by an operator of the detector depending on the properties of the expected concealed object, on environmental conditions, and on the detection resolution. In some embodiments, threshold 242 is set equal to threshold 244.

If a concealed object to be detected is expected to have a lower temperature or a lower emissivity, threshold 242 is defined at a substantially lower value (e.g., 80%) than the level of the left and right peaks 228 and 230. Amplitude signals in subsequent "real" measurements are compared with threshold 242. Consequently, any time-dependent variation of a measured amplitude signal which is substantially in the center of the plot and has a drop lower than threshold 242 is identified as indicating the potential presence of a concealed object.

If a concealed object to be detected is expected to have a higher temperature or a higher emissivity, a higher threshold 242 is defined above the level of left and right peaks 228 and 230. Consequently, a time-dependent variation of a measured amplitude signal which is substantially in center of the respective graph and has a peak higher than threshold 242 is identified as indicating a concealed object.

In some embodiments, both a higher threshold value and lower threshold value are defined for a single device for a given period of uses. An operator can adjust these levels in specific situations. For example, an embodiment of a device such as device 10 of FIG. 1 includes a user interface functionally associated with a device processor, such as processor 22 of FIG. 1. The user interface allows an operator to indicate "reference acquisition mode" and then perform a reference measurement as described hereinbelow with reference to FIG. 4A. The level of the plateau of plot 202 or of peaks 228 and 230 of plot 212 is stored as the "normal expected intensity value" considering the expected conditions of use, such as device condition, background noise, and rang). The operator may then use the user interface to set a "higher threshold" and a "lower threshold" as percentages of the "normal expected intensity value", e.g., "higher threshold" is 110% or 120% while "lower threshold" is 90% or 80% of the "normal expected intensity value".

According to some embodiments, a time-dependent amplitude signal that rises above threshold 240 and then rises further above threshold 244 identifies a person in the region of interest. If the amplitude signal then decreases below threshold 242, and then rises above threshold 242, it is considered that a concealed object has been detected and an indicator, such as indicator 18 of FIG. 1, indicates the detection of a concealed object. In contrast, if the amplitude signal does not rise above threshold 242 after a decrease below threshold 242, the indicator does not indicate the detection of a concealed object. When the amplitude signal decreases to below threshold 240, it is considered the end of a single scan over the body of the person. If, during the single scan, the signal did not include a drop requiring the processor to indicate the presence of a concealed object, at the end of the scan the indicator indicates the absence of a concealed object, as described hereinabove with reference to FIG. 1.

Figure 4A:
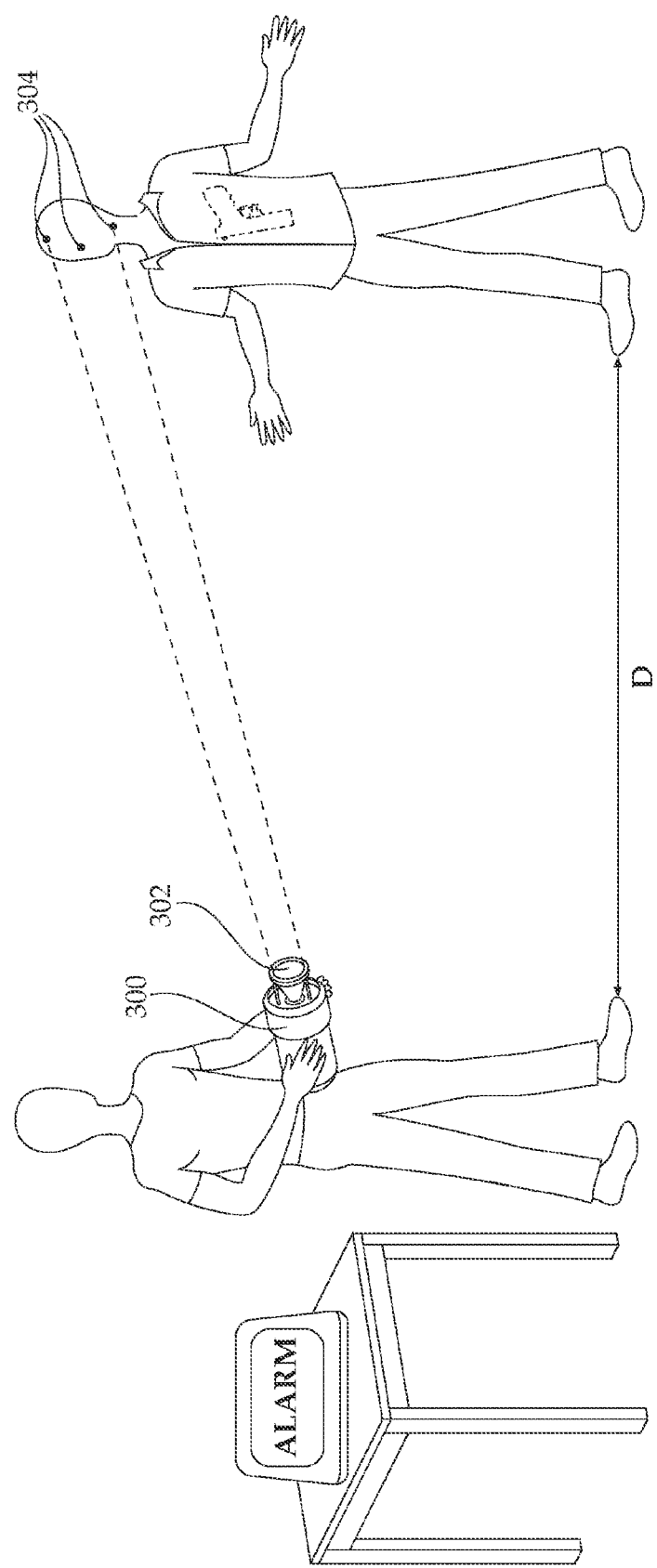
FIGS. 4A and 4B are pictorial illustrations of a method of detecting concealed objects using the detection device of FIG. 1 according to the teachings herein.
Figure 4B:
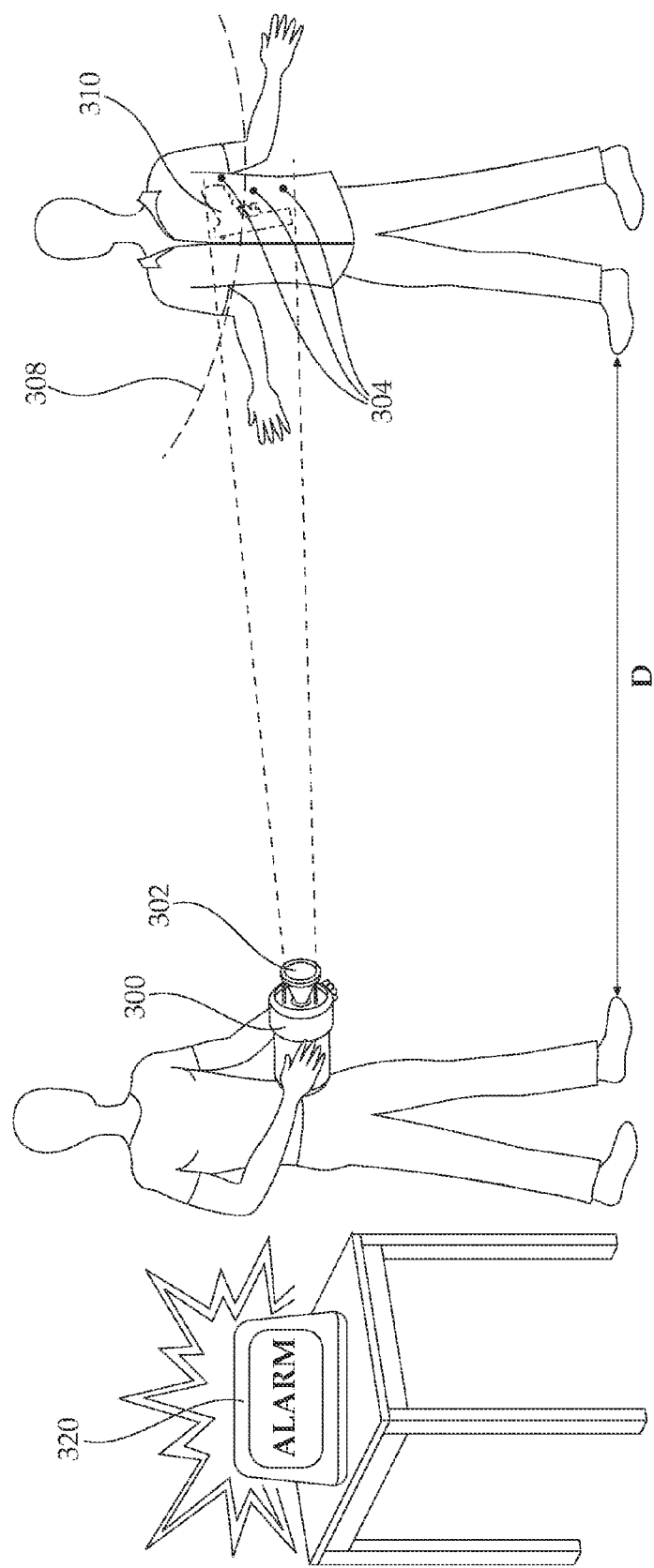

Reference is now made to FIGS. 4A and 4B, which are pictorial illustrations of a method of detecting concealed objects using a detection device according to the teachings herein.

As seen in FIG. 4A, an operator of a detection device 300, similar to device 10 of FIG. 1, points an antenna 302, similar to antenna 12 of device 10, towards a person. Specifically, in order to obtain a reference measurement of the millimeter-wave radiation emitted by the person, the operator points antenna 302 at a portion of the person which is not obscured, such as the target person's head.

In some embodiments, the operator identifies the location at which the antenna 302 is directed by using the light 304 formed on the body of the person from a directional light source such as directional light source 50 of FIG. 1.

In some embodiments, the person is located at a distance of approximately 2-3 meters from the operator of device 300 when the reference measurement is taken. However, any suitable distance D may be used when carrying out the method described herein.

Turning to FIG. 4B, it is seen that after the reference value is obtained as described with reference to FIG. 4A, the operator scans a region of interest, such as the body of the person, using the main lobe of antenna 302 of device 300. In some embodiments, the operator identifies the location at which antenna 302 is directed by using light 304 formed on the body of the person from a directional light source such as directional light source 50 of FIG. 1.

In some embodiments, the main lobe of antenna 302 is aimed slightly away from the person and device 300 is swung in a direction, for example, from left to right, as indicated by dashed line 308. When the main lobe of antenna 302 is aimed away from the person prior to beginning the scan, for example on the left side of line 308, a background signal is detected, corresponding to portion 214 of plots 202 and 212 of FIGS. 3A and 3B.

As the main lobe of antenna 302 covers more of the body of the person, more millimeter wave energy emitted by the person's body is detected so that the intensity of millimeter waves detected by device 300 increases. Since clothing is transparent to millimeter waves, the intensity of the signal substantially monotonously increases until the entire main lobe of antenna 302 is aimed at the person.

The intensity of the signal remains substantially constant as long as the entire main lobe is aimed at the person. When the main lobe reaches the edge of the person, for example on the right side of the person's body, the intensity of the signal decreases substantially monotonously since at each moment in time a smaller portion of the field of view of antenna 302 is directed at the person.

If during the scanning, a portion of the body of the person is obstructed by a sufficiently large object so that a sufficiently large fraction of millimeter waves emitted by the person's body are blocked, such as a mobile phone, knife, pack with explosives or gun obscured beneath the clothing, here illustrated as a concealed gun 310 a substantial drop in the signal intensity is identified by a processor of device 300, similar to processor 22 of FIG. 1. Such a drop is indicative of the presence of a concealed object, and results in activation of an indicator, such as indicator 18 of FIG. 1, indicating to the operator that concealed gun 310 is detected. In the illustrated embodiment, an alarm light 320 flashes when a drop in the signal intensity is detected.

In some embodiments, a detection device as described herein includes an array of directional antennas, the individual antennas aimed at different areas in the region of interest, so that each antenna receives radiation from a different area. In accordance with some such embodiments, the detection device having an array of directional antenna is useful e.g., for significantly reducing the time required to scan a large region of interest. By performing a scan in a perpendicular direction to the direction of a linear array of antennas (e.g., a vertical array of antennas and a scan performed in the horizontal direction), a large region of interest may be covered by a single scan.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

The invention claimed is:

1. A method for detecting a concealed object in a region of interest on a person, comprising:
   scanning said region of interest using a passive millimeter-wave detector comprising an antenna configured to receive millimeter wave radiation;
   providing to a processor an output of said scanning by said detector, which output comprises a signal corresponding to an intensity of said received millimeter wave radiation;
   in said processor, storing said output of said scanning;
   in said processor, processing a plot corresponding to said stored output to identify whether said plot is unimodal or bimodal; and
   indicating a result to an operator of said detector, wherein:
      if said plot is bimodal, indicating to said operator that a concealed object is potentially detected.

2. A method according to claim 1, wherein said indicating said result comprises, if said plot is unimodal, indicating to said operator that no concealed object was detected.

3. A method according to claim 1, comprising calibrating said detector by scanning an exposed portion of said person, outside said region of interest, prior to said scanning said region of interest.

4. A method according to claim 1, wherein said detector has dimensions and weight that allow one-handed operation.

5. A method according to claim 1, wherein said antenna has a main lobe having an angular width in the range of 1 degree to 12 degrees.

6. A method according to claim 1, wherein said antenna has a main lobe having an angular width in the range of 2 degrees to 9 degrees.

7. A method according to claim 1, wherein said antenna comprises a horn antenna.

8. A method according to claim 7, wherein said antenna comprises a focusing lens configured to focus incoming millimeter wave radiation into said horn antenna.

9. A method according to claim 1, wherein said intensity is of a portion of said received millimeter wave radiation having a frequency between 30 GHz and 300 GHz.

10. A method according to claim 1, also comprising providing to said operator an indication of said intensity of said received millimeter wave radiation.

11. A passive millimeter wave detector, comprising:
   a directional antenna configured to receive millimeter wave radiation having an intensity from a region of interest, and to output an electrical signal having an amplitude corresponding to said intensity;
   a high-frequency amplifier functionally associated with said directional antenna and configured to receive said electrical signal, to modulate said signal using a modulating signal, to amplify components of said electrical signal having high frequency, and to provide as output an amplified modulated signal corresponding to said electrical signal having amplified high frequency components;
   a high-frequency detector functionally associated with said high-frequency amplifier and configured to receive said amplified modulated signal, to restore said modulating signal, and to provide as output a demodulated signal corresponding in amplitude to said amplitude of said electrical signal;
   a low-frequency amplifier functionally associated with said high-frequency detector and configured to receive said demodulated signal, to amplify components of said demodulated signal having low-frequency, and to provide as output a signal having an amplitude corresponding to said amplitude of said demodulated signal, in digital format; and an intensity indicator functionally associated with said low-frequency amplifier and configured to receive said signal in said digital format and to indicate said intensity of said received millimeter wave radiation.

12. A passive millimeter wave detector according to claim 11, wherein said detector has dimensions and weight that allow it to be operated with one hand.

13. A passive millimeter wave detector according to claim 11, wherein said antenna comprises a horn antenna.

14. A passive millimeter wave detector according to claim 13, wherein said antenna comprises a focusing lens configured to focus incoming millimeter wave radiation into said horn antenna.

15. A passive millimeter wave detector according to claim 11, wherein said high-frequency amplifier is configured to amplify components of said electrical signal received from said antenna having frequencies of 70 GHz and higher.

16. A passive millimeter wave detector according to claim 11, wherein said low-frequency amplifier is configured to amplify components of said electrical signal received from said antenna having frequencies up to 110 GHz.

17. A passive millimeter wave detector according to claim 11, and further comprising a processor, functionally associated with said low-frequency amplifier and with said intensity indicator, and configured to:

during a period of time receive and store said output signal of said low-frequency amplifier in said digital format;

identify whether a plot of said stored output signal in said second format is unimodal or bimodal; and provide an indication to an operator of said detector, wherein:

if said plot is bimodal, said indication indicates the detection of a suspected concealed object.

18. A passive millimeter wave detector according to claim 17, wherein if said plot is unimodal, said indication indicates the absence of a concealed object.

19. A passive millimeter wave detector according to claim 17, wherein said processor is configured to:

define first, second, and third thresholds:

said first threshold corresponding to an intensity level which is above a background intensity level, said second threshold corresponding to an intensity level which is below an intensity level received from an exposed area on said person, and said third threshold corresponding to an intensity level which is a less than said second threshold and greater than said first threshold and is considered to be above an intensity level received from an area on said person where a said concealed object is suspected; and identify a relationship between said plot and said first, second, and third thresholds, wherein:

if during said scanning said plot rises above said first threshold and said second threshold, subsequently drops below said third threshold, subsequently rises above said second threshold, and finally drops below said first threshold, identify said plot as bimodal.

20. A passive millimeter wave detector according to claim 11, and also comprising at least one directional light source configured, during operation of said antenna, to project visible light indicating an area in said region of interest from which millimeter wave radiation is currently being received by said antenna.

* * * * *